United States Patent
Lin et al.

(10) Patent No.: US 10,333,837 B2
(45) Date of Patent: Jun. 25, 2019

(54) VIRTUAL NETWORK SWITCH SYSTEM AND METHOD OF CONSTRUCTING THE SAME

(71) Applicant: HONGFUJIN PRECISION ELECTRONICS (TIANJIN) CO., LTD., Tianjin (CN)

(72) Inventors: Ting-Chieh Lin, New Taipei (TW); Hao-Chiah Hung, New Taipei (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 287 days.

(21) Appl. No.: 15/458,728

(22) Filed: Mar. 14, 2017

(65) Prior Publication Data
US 2018/0123953 A1     May 3, 2018

(30) Foreign Application Priority Data
Oct. 31, 2016    (CN) .......................... 2016 1 0942451

(51) Int. Cl.
*G06F 15/177*    (2006.01)
*H04L 12/713*    (2013.01)
*H04L 12/46*     (2006.01)
*H04L 12/24*     (2006.01)
*H04L 12/935*    (2013.01)

(52) U.S. Cl.
CPC ........ *H04L 45/586* (2013.01); *H04L 12/4625* (2013.01); *H04L 12/4641* (2013.01); *H04L 41/0806* (2013.01); *H04L 41/12* (2013.01); *H04L 49/30* (2013.01)

(58) Field of Classification Search
CPC .............. H04L 45/586; H04L 12/4625; H04L 12/4641; H04L 41/0806; H04L 41/12; H04L 49/30
See application file for complete search history.

(56) References Cited

U.S. PATENT DOCUMENTS

| 8,812,876 | B1 * | 8/2014 | Ginzton | .............. | G06F 21/6281 |
| | | | | | 713/193 |
| 2004/0210623 | A1 * | 10/2004 | Hydrie | ................ | H04L 12/4641 |
| | | | | | 709/201 |

(Continued)

FOREIGN PATENT DOCUMENTS

WO    WO-2015102372 A1 *  7/2015    .......... G06F 9/45533

*Primary Examiner* — Jonathan A Bui
(74) *Attorney, Agent, or Firm* — ScienBiziP, P.C.

(57) ABSTRACT

A virtual network switching system for communicating with a plurality of physical network interface cards (NICs) of different connectivity specifications includes a building module, a mapping module, a determining module, and a control module. The building module builds a virtual switch, a plurality of virtual servers, and a plurality of virtual NICs in a server according to a received command. The mapping module builds a mapping relation between a first virtual server and a first virtual NIC according to a first virtual server network requirement, and transmits an access request from the first virtual NIC to a first physical NIC. The control module allows the first virtual NIC to access first physical NIC if the available resource of the first physical NIC is greater than the predetermined value. A method for building the virtual networking switch system is also provided.

20 Claims, 4 Drawing Sheets

(56) References Cited

U.S. PATENT DOCUMENTS

| | | | |
|---|---|---|---|
| 2008/0162800 A1* | 7/2008 | Takashige | G06F 9/5077 711/104 |
| 2009/0183180 A1* | 7/2009 | Nelson | G06F 9/45533 719/319 |
| 2015/0055499 A1* | 2/2015 | Zheng | H04L 47/56 370/252 |
| 2016/0253192 A1* | 9/2016 | Singaravelu | G06F 9/45537 718/1 |

* cited by examiner

VIRTUAL NETWORK SWITCH SYSTEM AND METHOD OF CONSTRUCTING THE SAME

FIELD

The subject matter herein generally relates to virtual network switch system.

BACKGROUND

In order to meet different network environments, IEEE 802.3 working group published several standards relating to 10 GbE, 40 GbE, and 100 GbE that lead the network interface card (NIC) interface connectors to be redesigned according to a variety of connectivity specifications. Most of switches only support one or two kinds of NIC interface connectors. Put multiple NIC interface connectors together can be difficult if the NIC interface connectors relate to more than two different connectivity specifications.

BRIEF DESCRIPTION OF THE DRAWINGS

Implementations of the present technology will now be described, by way of example only, with reference to the attached figures.

DETAILED DESCRIPTION

Figure 1:
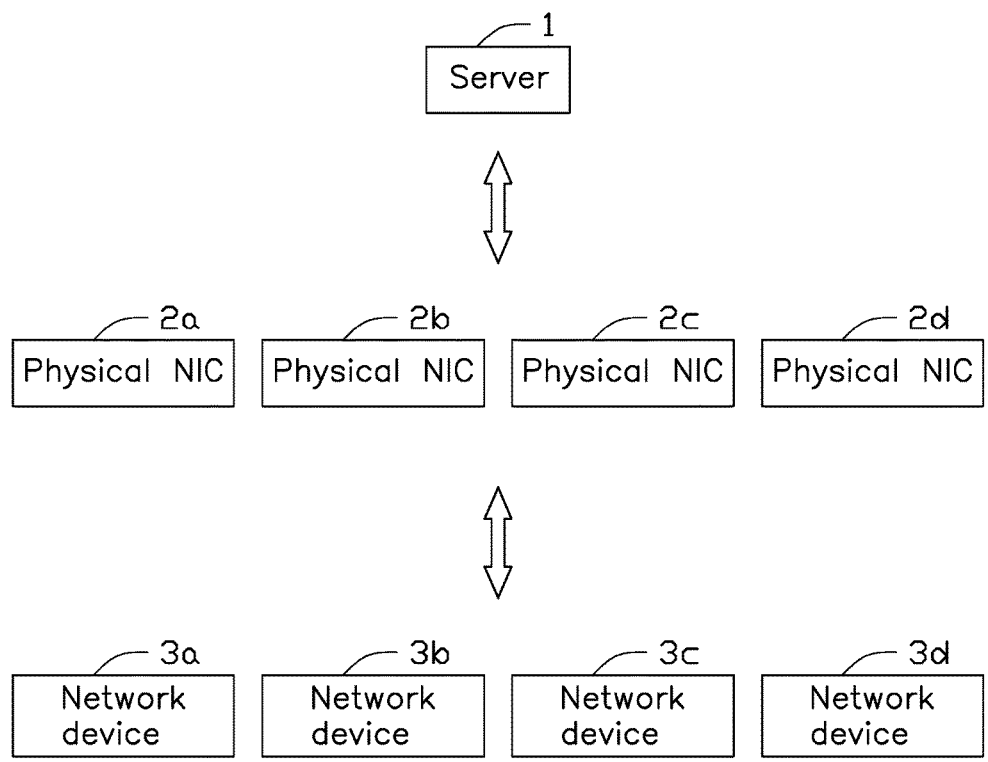
FIG. 1 is a diagram of an exemplary embodiment of a virtual network switch system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
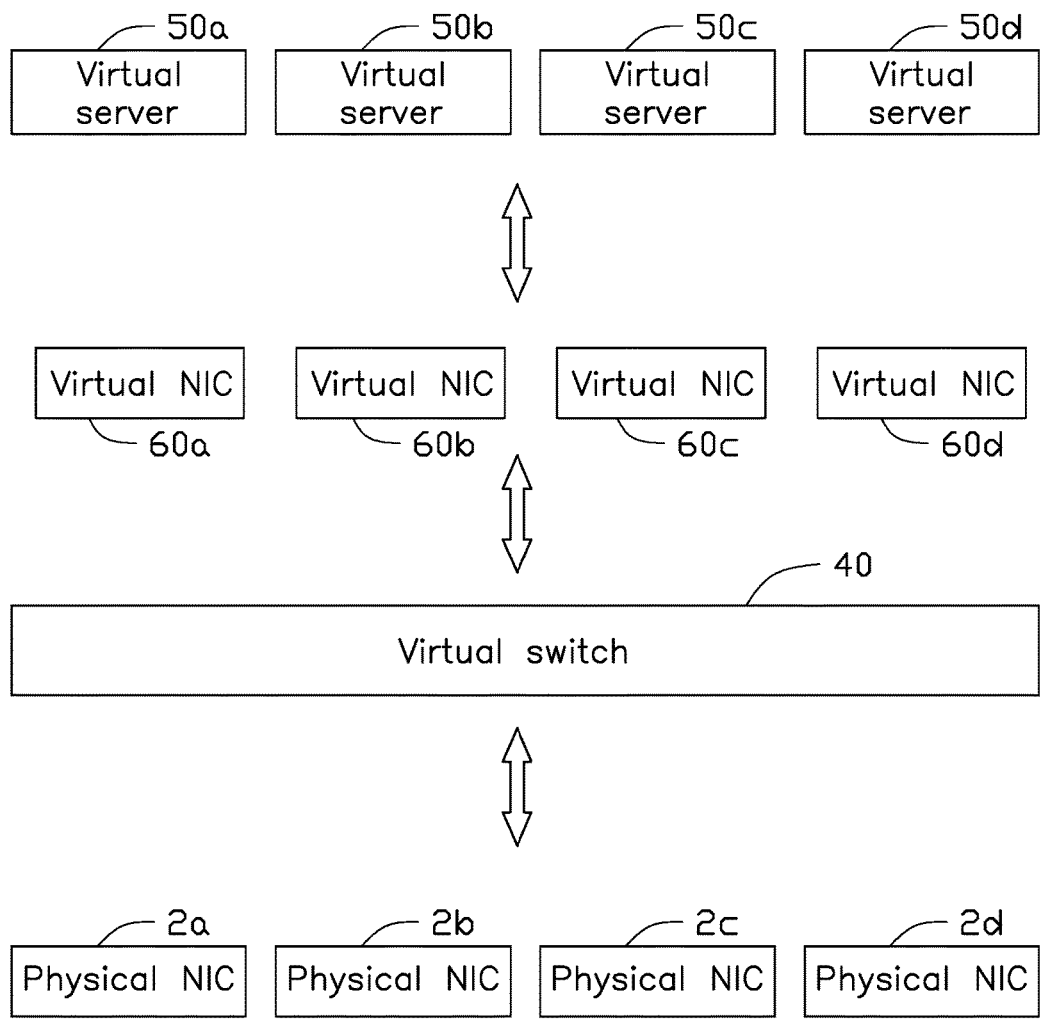
FIG. 2 is a diagram of an another exemplary embodiment of the virtual network switch system.
Figure 3:
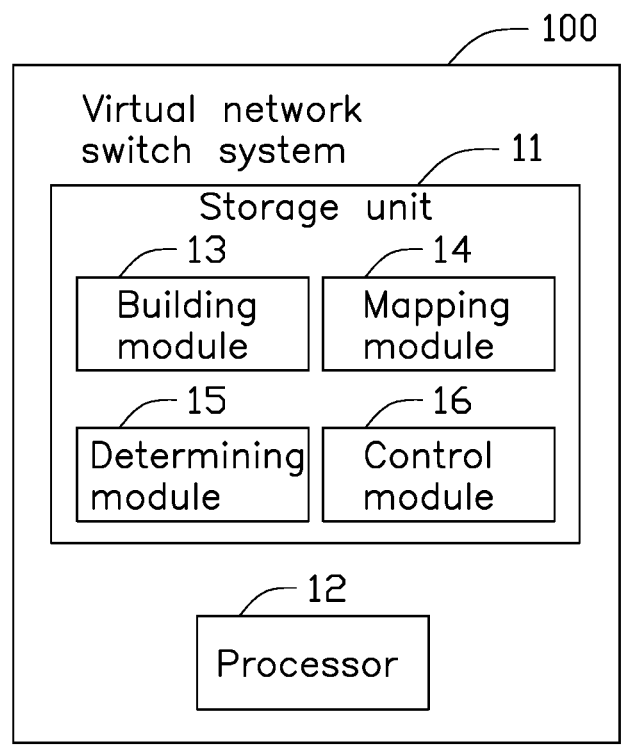
FIG. 3 is a block diagram of an exemplary embodiment of the virtual network switch system of FIG. 1.

FIG. 1-FIG. 3 illustrate a virtual network switch system 100 in accordance with the exemplary embodiments in the present disclosure.

Referring to FIG. 3, the virtual network switch system 100 can comprise at least one storage unit 11 and at least one processor 12. The virtual network switch system 100 can further include a plurality of modules, such as a building module 13, a mapping module 14, a determining module 15, and a control module 16. The modules 13-16 can include one or more software programs in the form of computerized codes stored in the storage unit 11. The computerized codes can include instructions that can be executed by the processor 12 to provide functions for the modules 13-16.

In one exemplary embodiment, the virtual network switch system 100 can operate in a server 1 as shown in FIG. 1. The server 1 is coupled to a plurality of physical network interface cards (NICs).

The building module 13, in FIG. 3, is configured to receive a command and build a virtual switch 40 as shown in FIG. 2, a plurality of virtual servers, and a plurality of virtual NICs in the server 1 according to the command. The plurality of virtual NICs can communicate with the plurality of physical NICs through the virtual switch 40.

In one exemplary embodiment, as shown in FIG. 2, the plurality of physical NICs in this exemplary embodiment comprises four physical NICs, 2a to 2d. The physical NICs 2a to 2d can comprise one or more connectivity specifications and one or more transmission rates. The plurality of virtual servers in this exemplary embodiment comprises four virtual servers 50a to 50d. The plurality of virtual NICs in this exemplary embodiment comprises four virtual NICs, 60a to 60d.

The virtual network switch system 100 is coupled to a plurality of network devices. The plurality of network devices in this exemplary embodiment comprises four network devices, 3a to 3d as shown in FIG. 1. The virtual network switch system 100 can operate as a network switch to communicate with the network devices 3a to 3d. The virtual network switch system 100 can supply network services to over more than two different NIC connectivity specifications.

For example, where the virtual NICs 60a to 60d comprise four different NIC connectivity specifications, the virtual network switch system 100 can operate to serve four different NIC connectivity specifications.

In one exemplary embodiment, the network devices 3a to 3d can comprise switches, computers, or servers <not shown>. One or more physical NICs can be installed in each of the network devices 3a to 3d. The physical NIC 2a can be installed in the network device 3a, the physical NIC 2b can be installed in the network device 3b, the physical NIC 2c can be installed in the network device 3c, and the physical NIC 2d can be installed in the network device 3d.

For example, a transmission rate of the physical NIC 2a can be 1 GB/s. A transmission rate of the physical NIC 2b can be 10 GB/s. A transmission rate of the physical NIC 2c can be 40 GB/s. A transmission rate of the physical NIC 2d can be 100 GB/s.

In one exemplary embodiment, the building module 13 can build the virtual servers 50a to 50d and the virtual NICs 60a to 60d in the server 1 according to a kernel virtual machine (KVM) technology.

When the building module 13 builds the virtual servers 50a to 50d in the server 1, the server 1 distributes available CPU core and available memory to each of the virtual servers 50a to 50d. The building module 13 can build the virtual switch 40 in the server 1 according to an open flow protocol.

In one exemplary embodiment, the building module 13 is further configured to analyze a network service requirement of the command and build the virtual switch 40, the virtual servers 50a to 50d, and the virtual NICs 60a to 60d in the server 1 according to the network service requirement.

For example, the building module 13 analyzes the network service requirement for a file transfer protocol (FTP) service, a pre-boot execution environment (PXE) service, a file service, and a domain name server (DNS) service. Then, the building module 13 needs to build an FTP virtual server (50a), a PXE virtual server (50b), a file virtual server (50c), and a virtual DNS (50d).

The mapping module 14 is configured to build a mapping relation between the virtual server 1a and at least one virtual NIC according to network requirement of the virtual server 1a. For example, the mapping module 14 builds a mapping relation between the virtual server 1a and the virtual NIC 60a according to the network requirement of the virtual server 1a, and transmits an access request of the virtual NIC 60a to the physical NIC 2a through the virtual switch 40.

In one exemplary embodiment, the physical NIC 2a is matched with the virtual NIC 60a, the physical NIC 2b is matched with the virtual NIC 60b, the physical NIC 2c is matched with the virtual NIC 60c, and the physical NIC 2d is matched with the virtual NIC 60d.

In one exemplary embodiment, the mapping module 14 also can build a mapping relation between the virtual server 1b and at least one virtual NIC according to network requirement of the virtual server 1b.

The virtual server 50a may need two physical NICs 2a and 2b to transmit or receive data according to the network requirement of the virtual server 50a. The mapping module 14 builds mapping relations between the virtual server 50a and the two virtual NICs 60a and 60b. The mapping module 14 transmits a first access request of the virtual NIC 60a to the physical NIC 2a and a second access request of the virtual NIC 60b to the physical NIC 2b through the virtual switch 40. When the virtual NIC 60a accesses the physical NIC 2a and the virtual NIC 60b accesses the physical NIC 2b, the virtual server 50a can communicate with the physical NICs 2a and 2b.

In one exemplary embodiment, the number of the virtual NICs is greater than the number of the virtual servers.

In one exemplary embodiment, the mapping module 14 is further configured to calculate a network transmission rate of each of the virtual servers 50a to 50d according to the network requirement of each of the virtual servers 50a to 50d. The mapping module 14 selects a physical NIC from the physical NICs 2a to 2d to match each of the virtual servers 50a to 50d according to the network transmission rate of each of the virtual servers 50a to 50d.

For example, the mapping module 14 builds a mapping relation between the virtual server 50a and the virtual NIC 60a and calculates a network transmission rate of the virtual server 50a according to the network requirement of the virtual server 50a. When the network transmission rate of the virtual server 50a is less than 1 GB/s, the physical NIC 2a (1 GB/s) can meet the network requirement of the virtual servers 50a. The mapping module 14 transmits the access request of the virtual NIC 60a to the physical NIC 2a through the virtual switch 40. When the network transmission rate of the virtual server 50a is greater than 10 GB/s and less than 40 GB/s, the physical NIC 2c (40 GB/s) can meet the network requirement of the virtual server 50a. The mapping module 14 transmits the access request of the virtual NIC 60a to the physical NIC 2c through the virtual switch 40.

For example, the mapping module 14 builds a first mapping relation between the virtual server 50a and the virtual NIC 60a and a second mapping relation between the virtual server 50a and the virtual NIC 60b. When the network transmission rate of the virtual server 50a is greater than 100 GB/s and less than 110 GB/s, the physical NIC 2b (10 GB/s) and the physical NIC 2d (100 GB/s) together meet the network requirement of the virtual servers 50a. The mapping module 14 transmits a first access request of the virtual NIC 60a to the physical NIC 2b and a second access request of the virtual NIC 60b to the physical NIC 2d through the virtual switch 40.

When the physical NIC 2a receives an access request outputted by the virtual NIC 60a, the determining module 15 is configured to determine whether an available resource of the physical NIC 2a is less than a predetermined value. When the available resource of the physical NIC 2a is greater than the predetermined value, the control module 16 is configured to control the physical NIC 2a to allow access by the virtual NIC 60a. Then, the physical NIC 2a can communicate with the virtual NIC 60a.

When the available resource of the physical NIC 2a is less than the predetermined value, the control module 16 is configured to control the physical NIC 2a to not allow access by the virtual NIC 60a and outputs an alarm. That is, the control module 16 is configured to control the physical NIC 2a to reject access by the virtual NIC 60a. An administrator can add a new physical NIC 2a into the virtual network switch system 100 to meet a requirement of the virtual NIC 60a according to the alarm.

In one exemplary embodiment, when the available resource of the physical NIC 2a is less than the predetermined value, the mapping module 30 is further configured to transmit the access request of the virtual NIC 60a to the physical NIC 2b through the virtual switch 40. When the available resource of the physical NIC 2b is greater than the predetermined value, the control module 16 controls the physical NIC 2b to allow access by the virtual NIC 60a. When the available resource of the physical NIC 2b is less than the predetermined value, the control module 16 controls the physical NIC 2b to not allow access by the virtual NIC 60a and outputs the alarm. Then, if the transmission rate of the physical NIC 2a is insufficient, the virtual NIC 60a can try to access other physical NICs 2b to 2d.

In one exemplary embodiment, when the physical NIC 2b receives an access request transmitted by the virtual NIC 60a, the determining module 15 also can determine whether an available resource of the physical NIC 2b is less than a predetermined value. When the available resource of the physical NIC 2b is greater than the predetermined value, the control module 16 controls the physical NIC 2b to allow access by the virtual NIC 60a.

In one exemplary embodiment, the predetermined value can be twenty percent of a total resource of the physical NIC. When the available resource of the physical NIC 2a is less than the predetermined value, the physical NIC 2a is operating in a congested state.

In one exemplary embodiment, access by the virtual NIC 60a to the physical NIC 2a is according to a single root I/O virtualization (SR-IOV).

In one exemplary embodiment, each of the physical NICs 2a to 2d can allow one or more virtual NICs to access at the same time. For example, when the physical NIC 2a is matched to the virtual NICs 60a and 60b and the physical NIC 2a has enough available resource, the physical NIC 2a allows the virtual NICs 60a and 60b to access at the same time.

In one exemplary embodiment, when the network requirement of each of the virtual servers 50a to 50d is changed, each of the virtual servers 50a to 50d can communicate with different physical NICs.

For example, the virtual server 50a comprises three operating states, each operating state corresponds to different network requirements. When the virtual server 50a operates in a first operating state, the virtual server 50a communicates with the physical NIC 2a. When the virtual server 50a operates in a second operating state, the virtual server 50a communicates with the physical NIC 2b. When the virtual server 50a operates in a third operating state, the virtual server 50a communicates with the physical NIC 2d.

Figure 4:
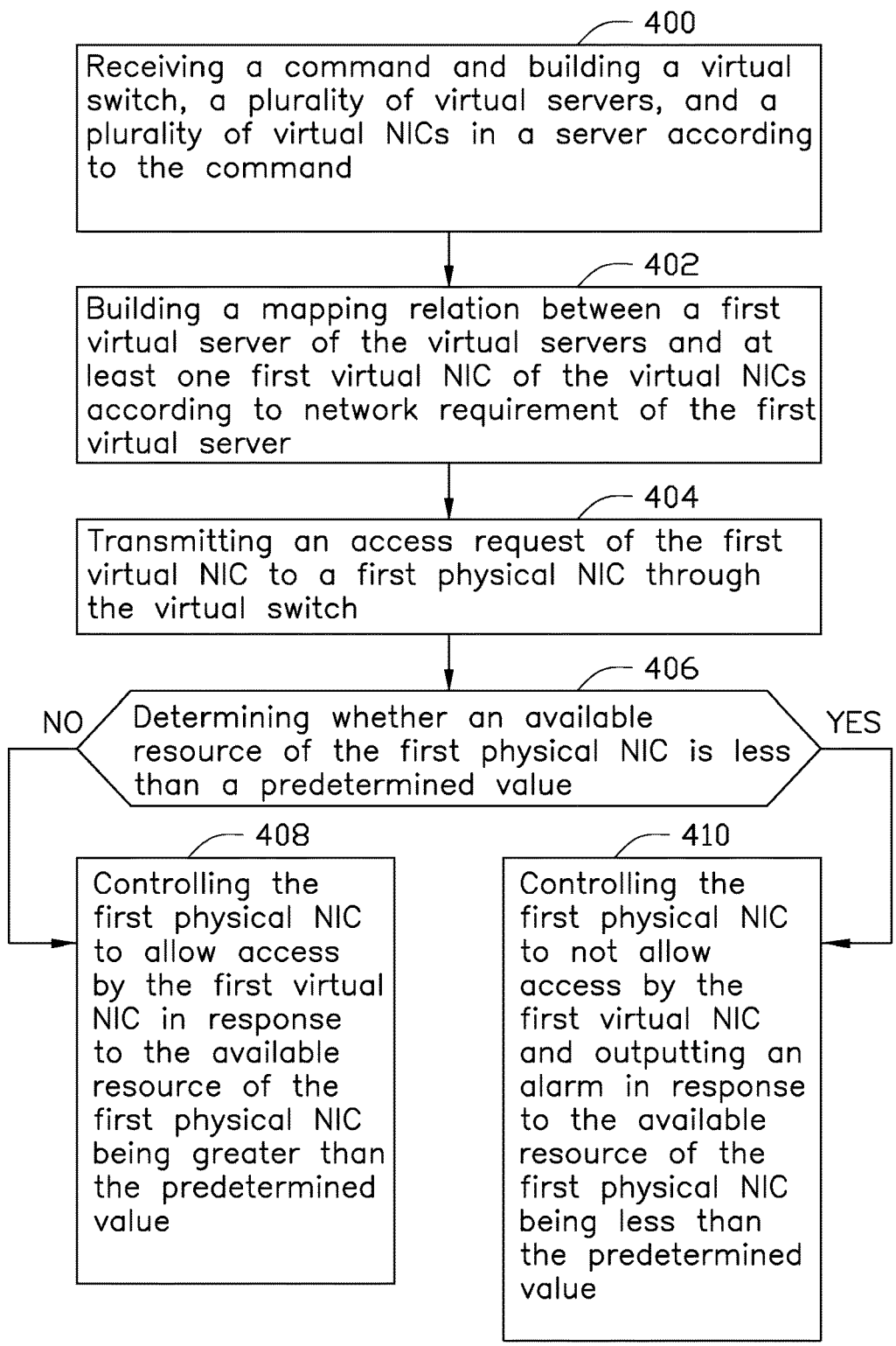
FIG. 4 is a flow diagram of an exemplary embodiment of a method for building the virtual network switch system of FIG. 1.

FIG. 4 illustrates one exemplary embodiment of a method for building the virtual network switch system 100. The flowchart presents an example embodiment of the method. The example method is provided by way of example, as there are a variety of ways to carry out the method. The method described below can be carried out using the configurations illustrated in FIG. 3, for example, and various elements of these figures are referenced in explaining the example method. Each step shown in FIG. 4 represents one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step 400.

In step 400, the building module 13 receives a command and builds the virtual switch 40, the plurality of virtual servers 50a to 50d, and the plurality of virtual NICs 60a to 60d in the server 1 according to the command.

In step 402, the mapping module 14 builds a mapping relation between the virtual server 50a and at least one virtual NIC (virtual NIC 60a for example) according to network requirement of the virtual server 50a.

In step 404, the mapping module 14 transmits an access request of the virtual NIC 60a to the physical NIC 2a through the virtual switch 40. The physical NIC 2a is matched with the virtual NIC 60a.

In step 406, the determining module 15 determines whether an available resource of the physical NIC 2a is less than a predetermined value.

In step 408, the control module 16 controls the physical NIC 2a to allow access by the virtual NIC 60a in response to the available resource of the physical NIC 2a being greater than the predetermined value.

In step 410, the control module 16 controls the physical NIC 2a to not allow access by the virtual NIC 60a and outputs an alarm in response to the available resource of the physical NIC 2a being less than the predetermined value.

Detailed descriptions and configurations of the virtual server 50b, the virtual server 50c, and the virtual server 50d, being substantially the same as for those of the virtual server 50a, are omitted.

In one exemplary embodiment, the building module 13 further analyzes a network service requirement of the command and builds the virtual switch 40, the virtual servers 50a to 50d, and the virtual NICs 60a to 60d in the server 1 according to the network service requirement.

In one exemplary embodiment, the mapping module 14 further calculates a network transmission rate of the virtual server 50a according to the network requirement of the virtual server 50a. The mapping module 14 selects a physical NIC from the physical NICs 2a to 2d to match the virtual server 50a according to the network transmission rate of the virtual server 50.

In one exemplary embodiment, the physical NICs 2a to 2d can comprise one or more connectivity specifications and one or more transmission rates.

In one exemplary embodiment, when the available resource of the physical NIC 2a is less than the predetermined value, the mapping module 30 is further configured to transmit the access request of the virtual NIC 60a to the physical NIC 2b through the virtual switch 40. When the available resource of the physical NIC 2b is greater than the predetermined value, the control module 16 controls the physical NIC 2b to allow access by the virtual NIC 60a. A transmission rate of the physical NIC 2a is less than a transmission rate of the physical NIC 2b. Then, if the transmission rate of the physical NIC 2a is insufficient, the virtual NIC 60a can try to access other physical NICs 2b to 2d.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method for building a virtual network switch system comprising:
   receiving a command and building a virtual switch, a plurality of virtual servers, and a plurality of virtual network interface cards (NICs) in a server according to the command;
   building a mapping relation between a first virtual server of the virtual servers and at least one first virtual NIC of the virtual NICs according to network requirement of the first virtual server;
   transmitting an access request of the first virtual NIC to a first physical NIC through the virtual switch;
   determining whether an available resource of the first physical NIC is less than a predetermined value; and
   controlling the first physical NIC to allow access by the first virtual NIC in response to the available resource of the first physical NIC being greater than the predetermined value;
   wherein a plurality of physical NICs is connected to the server and the first physical NIC of the physical NICs is matched with the first virtual NIC.

2. The method of claim 1, wherein the physical NICs comprise one or more transmission rates.

3. The method of claim 1, wherein the step of receiving the command and building the virtual switch, the plurality of virtual servers, and the plurality of virtual NICs in the server according to the command comprises:
   receiving the command and analyzing a network service requirement of the command; and
   building the virtual switch, the plurality of virtual servers, and the plurality of virtual NICs in the server according to the network service requirement of the command.

4. The method of claim 1, wherein the step of building the mapping relation between the first virtual server and at least one first virtual NIC according to the network requirement of the first virtual server comprises:
- calculating a network transmission rate of the first virtual server according to the network requirement of the first virtual server; and
- building the mapping relation between the first virtual server and at least one first virtual NIC according to the network transmission rate of the first virtual server.

5. The method of claim 4, wherein the step of transmitting the access request of the first virtual NIC to the first physical NIC through the virtual switch comprises:
- selecting the first physical NIC from the physical NICs according to the network transmission rate of the first virtual server; and
- transmitting the access request of the first virtual NIC to the first physical NIC through the virtual switch.

6. The method of claim 1, further comprising:
- controlling the first physical NIC to not allow access by the first virtual NIC and outputting an alarm in response to the available resource of the first physical NIC being less than the predetermined value.

7. The method of claim 1, further comprising:
- transmitting the access request of the first virtual NIC to a second physical NIC of the physical NICs through the virtual switch in response to the available resource of the first physical NIC being less than the predetermined value; and
- controlling the second physical NIC to allow access by the first virtual NIC in response to the available resource of the second physical NIC being greater than the predetermined value;
- wherein a first physical NIC transmission rate is less than a second physical NIC transmission rate.

8. The method of claim 7, further comprising:
- controlling the second physical NIC to not allow access by the first virtual NIC and outputting an alarm in response to the available resource of the second physical NIC being less than the predetermined value.

9. A virtual network switch system comprising:
- at least one storage unit configured to store a plurality of modules, being a collection of instructions of an application operable in the system;
- at least one processor configured to execute the plurality of modules, the modules comprising:
- a building module configured to receive a command and build a virtual switch, a plurality of virtual servers, and a plurality of virtual NICs in a server according to the command;
- a mapping module configured to build a mapping relation between a first virtual server of the virtual servers and at least one first virtual NIC of the virtual NICs according to network requirement of the first virtual server, and transmit an access request of the first virtual NIC to a first physical NIC through the virtual switch; and
- a determining module configured to determine whether an available resource of the first physical NIC is less than a predetermined value;
- a control module configured to control the first physical NIC to allow access by the first virtual NIC in response to the available resource of the first physical NIC being greater than the predetermined value;
- wherein a plurality of physical NICs is connected to the server and the first physical NIC of the physical NICs is matched with the first virtual NIC.

10. The virtual network switch system of claim 9, wherein the physical NICs comprise one or more transmission rates.

11. The virtual network switch system of claim 9, wherein the building module is further configured to analyze a network service requirement of the command and build the virtual switch, the plurality of virtual servers, and the plurality of virtual NICs in the server according to the network service requirement of the command.

12. The virtual network switch system of claim 9, wherein the mapping module is further configured to calculate a network transmission rate of the first virtual server according to the network requirement of the first virtual server and build the mapping relation between the first virtual server and at least one first virtual NIC according to the network transmission rate of the first virtual server.

13. The virtual network switch system of claim 12, wherein the mapping module is further configured to select the first physical NIC from the physical NICs according to the network transmission rate of the first virtual server.

14. The virtual network switch system of claim 9, wherein the control module is further configured to control the first physical NIC to not allow access by the first virtual NIC and output an alarm in response to the available resource of the first physical NIC being less than the predetermined value.

15. The virtual network switch system of claim 9, wherein the mapping module is further configured to transmit the access request of the first virtual NIC to a second physical NIC of the physical NICs through the virtual switch in response to the available resource of the first physical NIC being less than the predetermined value; and a first physical NIC transmission rate is less than a second physical NIC transmission rate.

16. The virtual network switch system of claim 15, wherein the control module is further configured to control the second physical NIC to not allow access by the first virtual NIC and output an alarm in response to the available resource of the second physical NIC being less than the predetermined value.

17. A server connected to a plurality of physical NICs, the server comprising:
- at least one storage unit configured to store a plurality of modules, being a collection of instructions of an application operable in the system;
- at least one processor configured to execute the plurality of modules, the modules comprising:
- a building module configured to receive a command and build a virtual switch, a plurality of virtual servers, and a plurality of virtual NICs in the server according to the command;
- a mapping module configured to build a mapping relation between a first virtual server of the virtual servers and at least one first virtual NIC of the virtual NICs according to network requirement of the first virtual server, and transmit an access request of the first virtual NIC to a first physical NIC of the physical NICs through the virtual switch; and
- a determining module configured to determine whether an available resource of the first physical NIC is less than a predetermined value;
- a control module configured to control the first physical NIC to allow access by the first virtual NIC in response to the available resource of the first physical NIC being greater than the predetermined value;
- wherein the first physical NIC is matched with the first virtual NIC.

18. The server of claim 17, wherein the building module is further configured to analyze a network service requirement of the command and build the virtual switch, the plurality of virtual servers, and the plurality of virtual NICs in the server according to the network service requirement of the command.

19. The server of claim 17, wherein the mapping module is further configured to calculate a network transmission rate of the first virtual server according to the network requirement of the first virtual server and build the mapping relation between the first virtual server and at least one first virtual NIC according to the network transmission rate of the first virtual server; and the mapping module is further configured to select the first physical NIC from the physical NICs according to the network transmission rate of the first virtual server.

20. The server of claim 17, wherein the control module is further configured to control the first physical NIC to not allow access by the first virtual NIC and output an alarm in response to the available resource of the first physical NIC being less than the predetermined value.

* * * * *